United States Patent
Zhang et al.

(10) Patent No.: US 7,515,404 B2
(45) Date of Patent: Apr. 7, 2009

(54) LATCH MECHANISM FOR FOLDABLE ELECTRONIC DEVICE

(75) Inventors: Jie Zhang, Shenzhen (CN); Chien-Li Tsai, Tu-Cheng (TW); Ke-Cheng Lin, Tu-Cheng (TW); Hsuan-Chen Chen, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 279 days.

(21) Appl. No.: 11/309,706

(22) Filed: Sep. 15, 2006

(65) Prior Publication Data

US 2007/0115622 A1   May 24, 2007

(30) Foreign Application Priority Data

Nov. 8, 2005   (CN) .................. 2005 2 0067279

(51) Int. Cl.
*H05K 5/00* (2006.01)
*H05K 7/00* (2006.01)
*G06F 1/16* (2006.01)
*E05C 1/02* (2006.01)

(52) U.S. Cl. ............... 361/683; 361/679; 292/137

(58) Field of Classification Search ........... 361/683, 361/681, 679; 292/137
See application file for complete search history.

(56) References Cited

U.S. PATENT DOCUMENTS

| 6,115,239 | A | 9/2000 | Kim |
| 6,540,268 | B2 * | 4/2003 | Pauser ................ 292/48 |
| 6,890,008 | B1 * | 5/2005 | Chuang et al. ............ 292/121 |
| 7,276,660 | B2 * | 10/2007 | Lai et al. ................ 174/50 |
| 2005/0206169 | A1 * | 9/2005 | Lin et al. ................ 292/24 |
| 2005/0286215 | A1 * | 12/2005 | Yang et al. ............... 361/683 |
| 2006/0038415 | A1 * | 2/2006 | Liu et al. ................ 292/251.5 |

* cited by examiner

*Primary Examiner*—Jayprakash N Gandhi
*Assistant Examiner*—Anthony M Haughton
(74) *Attorney, Agent, or Firm*—Wei Te Chung

(57) ABSTRACT

A latch mechanism for fixing a cover unit to a base unit of a foldable electronic device in a closed position is provided. The latch mechanism includes a locking member, an operating member, and at least one resilient member. The base unit includes a pair of recessed portions. The locking member is adapted for be pivotably received in the cover unit. The locking member includes a pair of locking portions for engaging with the corresponding recessed portions of the base unit. The operating member is adapted for be slidably mounted to the cover unit. The operating member includes at least one latch slidable toward the locking member to drive the locking member to pivot. The resilient member is connectable with the operating member and adapted for engage with the cover unit of the foldable electronic device, for urging the operating member away from the locking member.

20 Claims, 6 Drawing Sheets

LATCH MECHANISM FOR FOLDABLE ELECTRONIC DEVICE

FIELD OF THE INVENTION

The present invention relates to latch mechanisms, and particularly to a latch mechanism which readily allows opening or closing a cover unit of a foldable electronic device.

DESCRIPTION OF RELATED ART

A typical foldable electronic device, such as a notebook computer, includes a base unit, and a cover unit with a rear end pivotably mounted to a rear end of the base unit by hinges. Generally, the notebook computer includes a latch mechanism mounted to a front side of the cover unit for fixing the cover unit to the base unit in a closed position.

As disclosed in U.S. Pat. No. 6,115,239, a latch mechanism for locking a cover unit to a base unit, includes a latch frame movably installed inside the cover unit, a plurality of latches are formed on the latch frame at predetermined intervals and one end portion thereof protrudes from a front surface of the cover unit, and a slide knob is operatively connected to the latch frame for concurrently operating the latches. The latches are inserted into and locked by latch grooves formed at positions corresponding to the latches on an upper surface of the base unit. The latches are urged against the base unit by elastic forces applied by double springs mounted on two ends of the latch frame. However, to open the cover unit, the slide knob is slid to overcome the elastic forces of the springs to move the latch mechanism for disengaging from the base unit. The slide force depends on friction between the slide knob and fingers of an operator. It is laborious for an operator to provide enough force to move a slide knob.

What is desired, therefore, is a latch mechanism which readily allows opening or closing a cover unit of a foldable electronic device.

SUMMARY OF THE INVENTION

An exemplary latch mechanism for fixing a cover unit to a base unit of a foldable electronic device in a closed position is provided. The latch mechanism includes a locking member, an operating member, and at least one resilient member. The base unit includes a pair of recessed portions. The locking member is adapted for be pivotably received in the cover unit. The locking member includes a pair of locking portions for engaging with the corresponding recessed portions of the base unit. The operating member is adapted for be slidably mounted to the cover unit. The operating member includes at least one latch slidable toward the locking member to drive the locking member to pivot. The resilient member is connectable with the operating member and adapted for engage with the cover unit of the foldable electronic device, for urging the operating member away from the locking member.

Other advantages and novel features will become more apparent from the following detailed description when taken in conjunction with the accompanying drawings, in which:

DETAILED DESCRIPTION OF THE INVENTION

Figure 1:
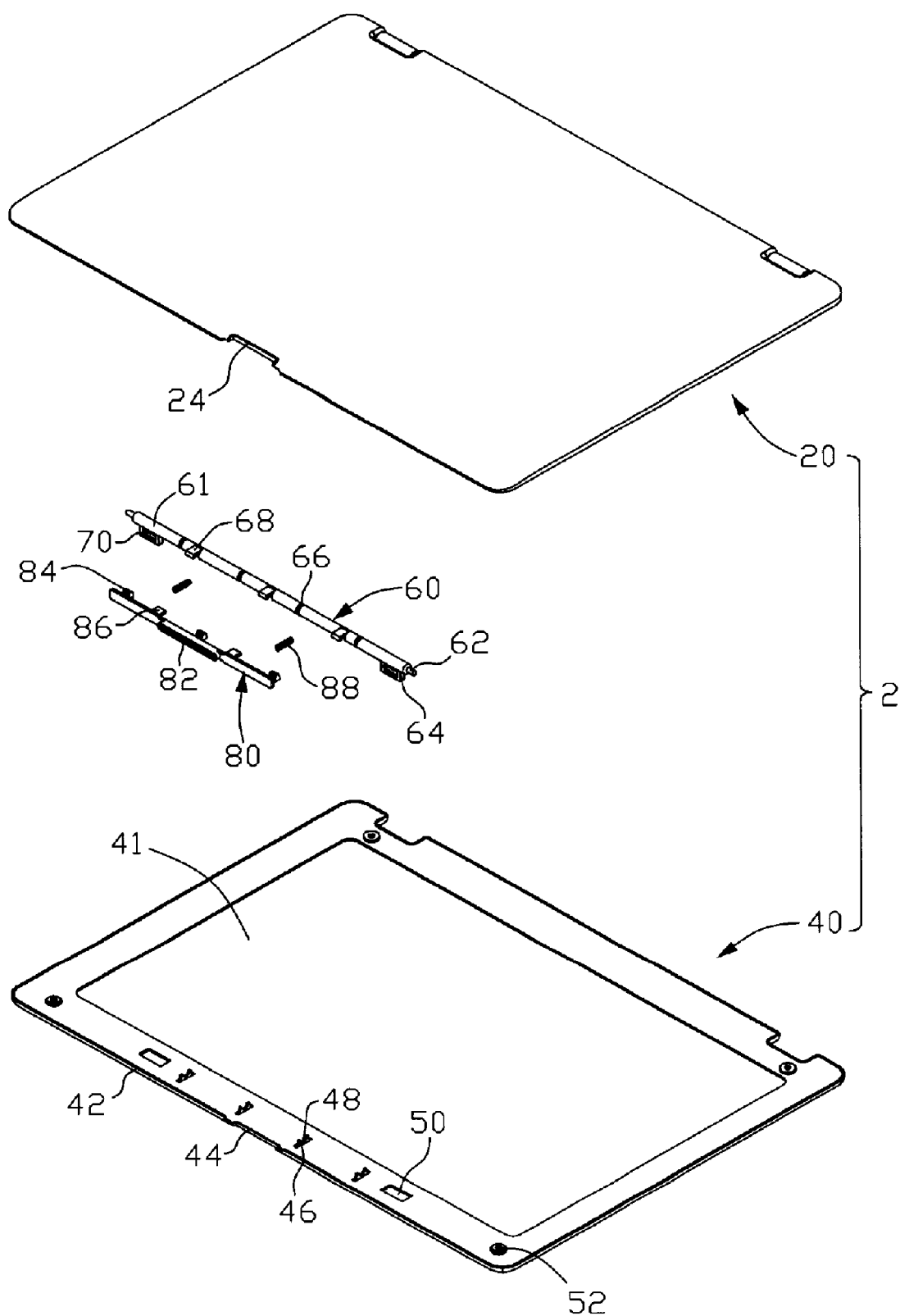
FIG. 1 is an exploded, isometric view of a cover unit of a foldable electronic device in accordance with a preferred embodiment of the present invention, the cover unit of the foldable electronic device includes a cover, a bezel, and a latch mechanism.
Figure 5:
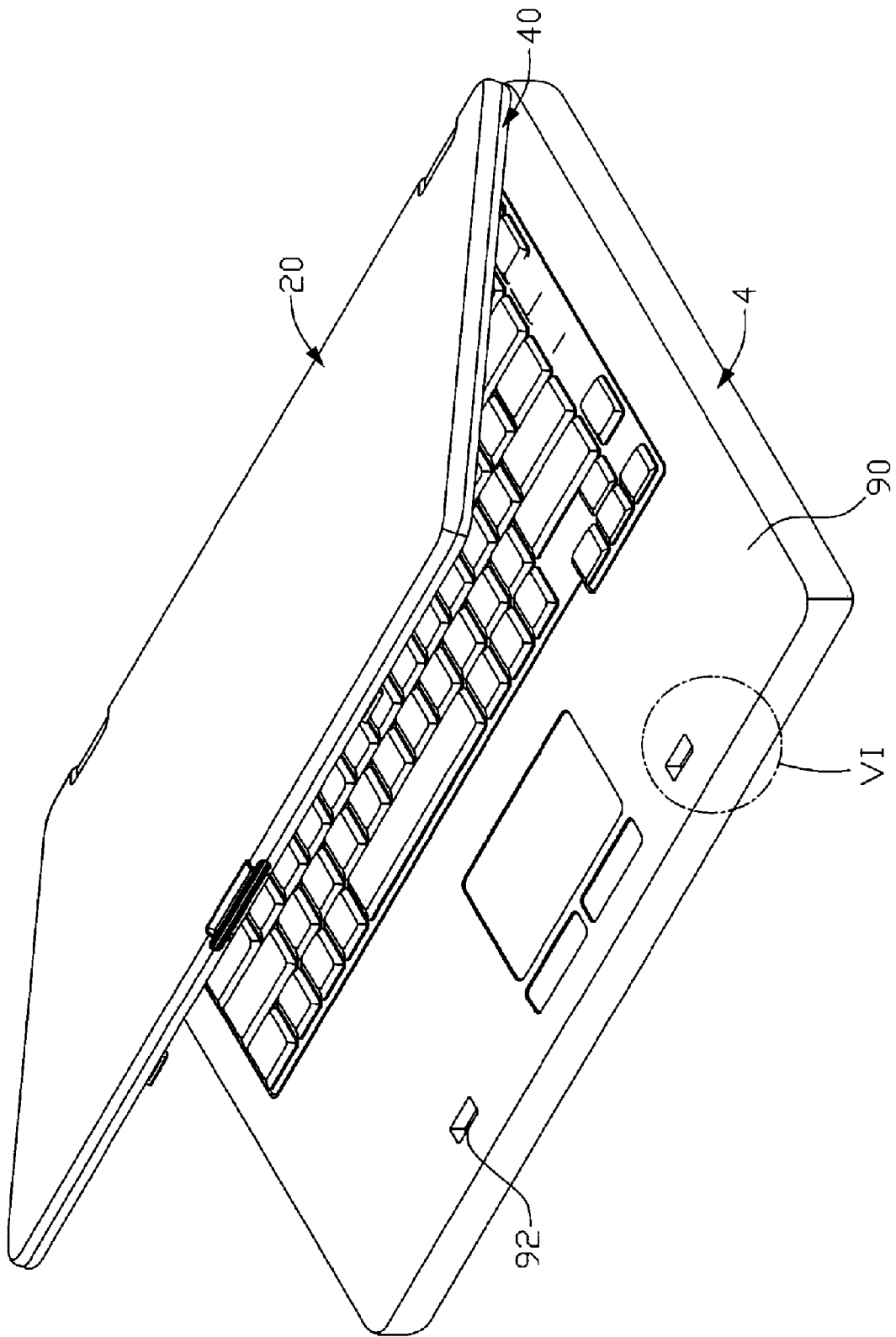
FIG. 5 is a view showing the latch mechanism assembled to the foldable electronic device.

Referring to FIGS. 1 and 5, a foldable electronic device in accordance with a preferred embodiment of the present invention is shown. The foldable electronic device of this embodiment is a notebook computer. The notebook computer includes a base unit 4, a cover unit 2 pivotably mounted to the base unit 4, and a latch mechanism. The cover unit 2 includes a cover 20, and a bezel 40. The cover 20 and the bezel 40 are for mounting a liquid crystal display panel (not shown) therebetween. The latch mechanism includes a locking member 60, an operating member 80, and a pair of resilient members 88.

Figure 2:
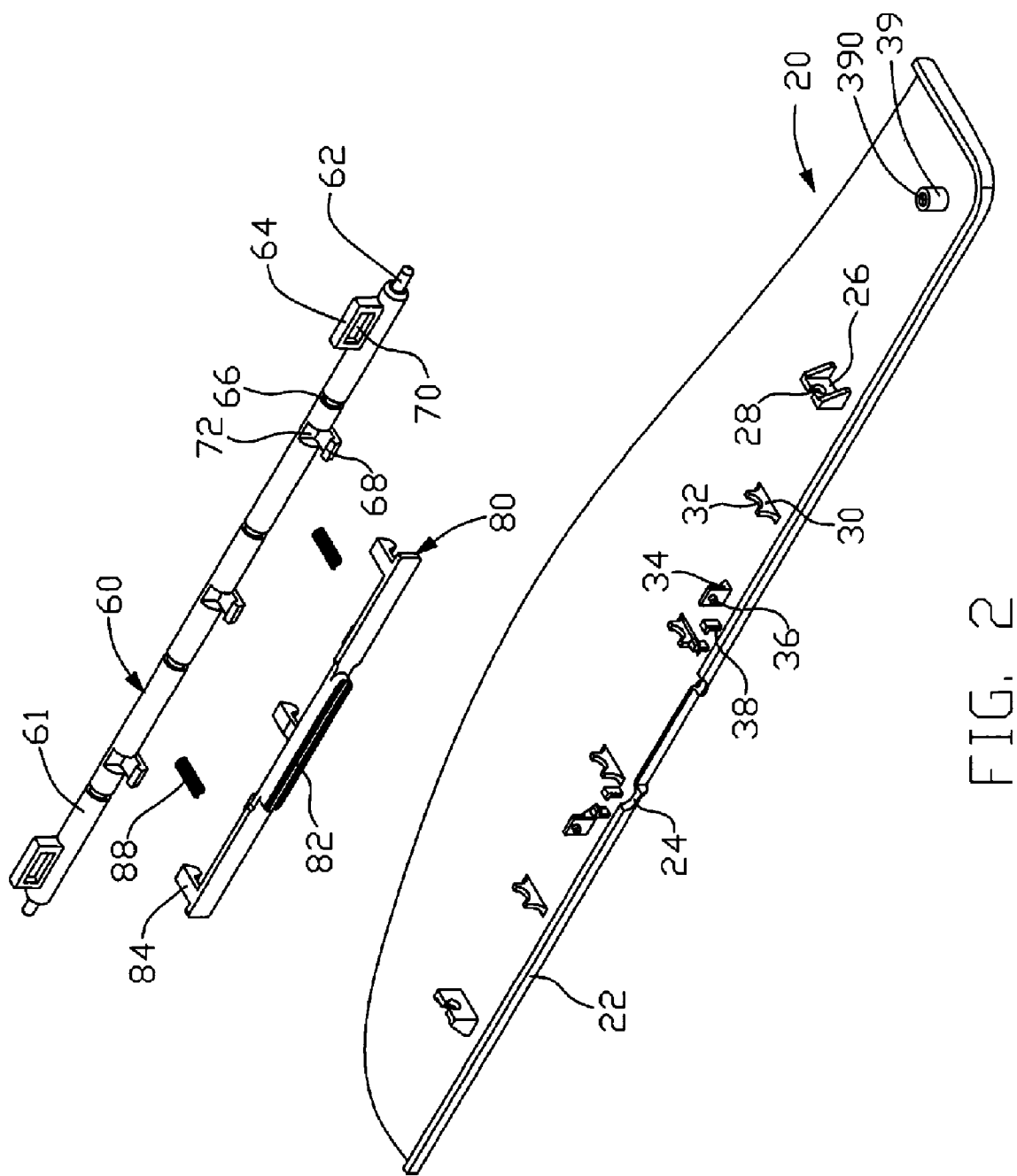
FIG. 2 is an inverted exploded, isometric view of the latch mechanism, and a part of the cover of FIG. 1.

Referring also to FIG. 2, a flange 22 depends from a front edge of the cover 20. The flange 22 defines a cutout 24 in a middle portion thereof. A pair of locating portions 26 is formed adjacent the flange 22 on an internal side of the cover 20. Each locating portion 26 defines a receiving cutout 28 therein. A plurality of mounting tabs 30 depends from the internal side of the cover 20, between the locating portions 26. Each mounting tab 30 defines a receiving slot 32 therein. A pair of projections 34 depends from the internal side of the cover 20, adjacent the cutout 24. Each projection 34 forms a post 36 toward the flange 22 therefrom. A pair of L-shaped receiving tabs 38 is formed adjacent each projection 34 on the internal side of the cover 20, cooperatively defining a receiving space. Four positioning posts 39 depend from four corners of the internal side of the cover 20. Each positioning post 39 defines a threaded hole 390 in a distal end thereof.

The bezel 40 defines an opening 41 therein. A flange 42 extends up from a front edge of the bezel 40. The flange 42 defines a cutout 44 in a middle portion thereof, corresponding to the cutout 24 of the cover 20. A plurality of mounting tabs 46 extends up from an internal side of the bezel 40, corresponding to the mounting tabs 30 of the cover 20. Each mounting tab 46 defines a receiving cutout 48 therein. The bezel 40 defines a pair of through-holes 50 adjacent the flange 42 thereof. Four through holes 52 are defined in four corners of the bezel 40 corresponding to the positioning posts 39 of the cover 20.

The locking member 60 includes a long body 61. Two mounting posts 62 extend out from opposite distal ends of the body 61, respectively. A pair of locking portions 64 extends vertically from a circumferential surface adjacent the distal ends of the body 61, corresponding to the through-holes 50 of the bezel 40. Each locking portion 64 defines a locking hole 70 therein. The body 61 includes a plurality of recessed portions 66, corresponding to the mounting tabs 30, 46 of the cover 20 and the bezel 40. A plurality of hooks 68 extends horizontally from the body 61. A plurality of recesses 72 is defined in the body 61, adjoining the corresponding hooks 68. The recessed portions 66 and the hooks 68 are alternately arranged on the body 61.

The operating member 80 forms an operating portion 82 protruding out from a middle portion of a front side thereof. A plurality of latches 84 extends from a rear side of the operating member 80 toward the corresponding hooks 68 of the locking member 60. The operating member 80 forms a pair of sliding tabs 86 extending from the rear side thereof. A pair of posts (not shown) extends from the rear side of the operating member 80 to the locking member 60, adjacent the sliding tabs 86, corresponding to the posts 36 of the cover 20.

Figure 6:
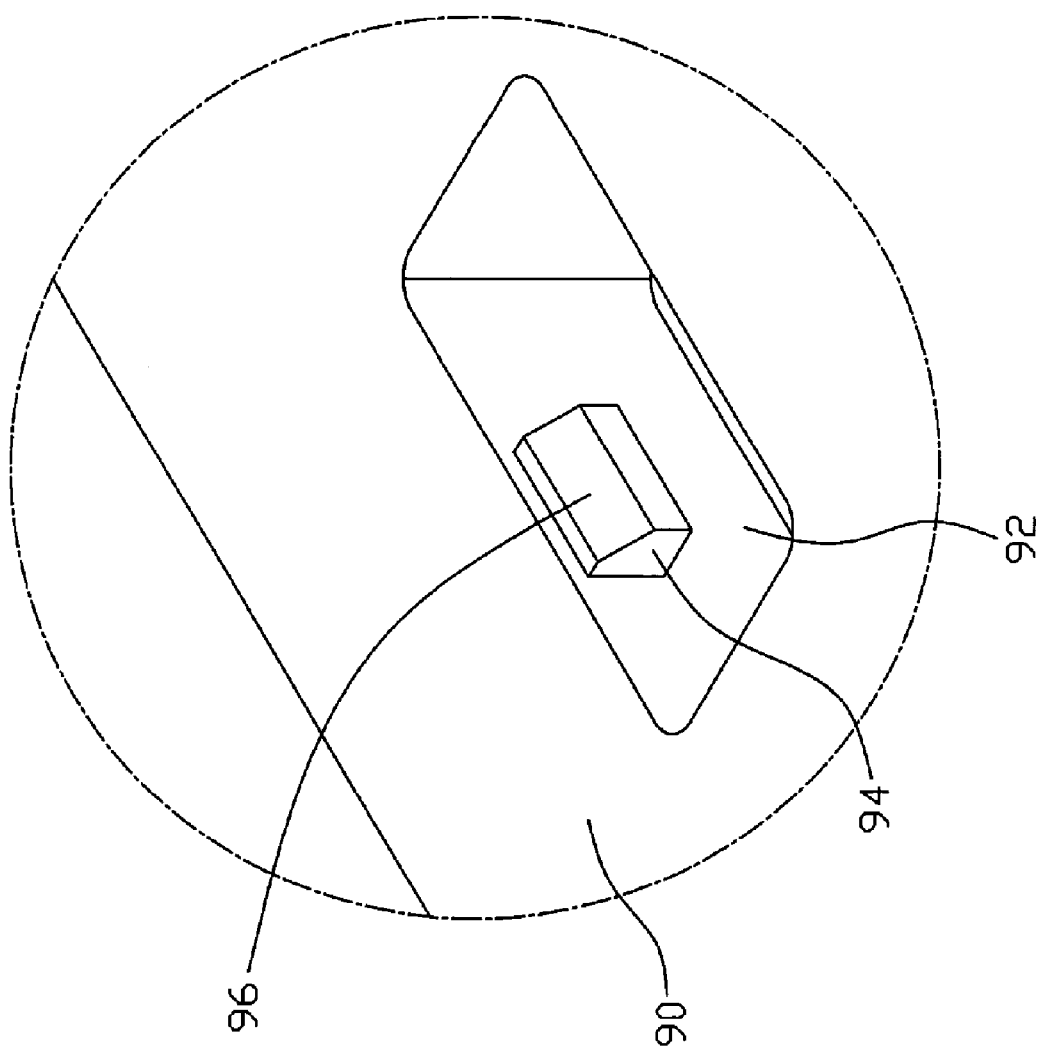
FIG. 6 is an enlarged view of a circled portion VI of FIG. 5, but viewed from another aspect.

Referring also to FIG. 6, the base unit 4 includes a top wall 90. A pair of recessed portions 92 is defined in the top wall 90 at a front side of the top wall 90. Each recessed portion 92 forms a protrusion 94 protruding from a front side thereof. The protrusion 94 has a slanting guiding surface 96 at a top thereof.

Figure 3:
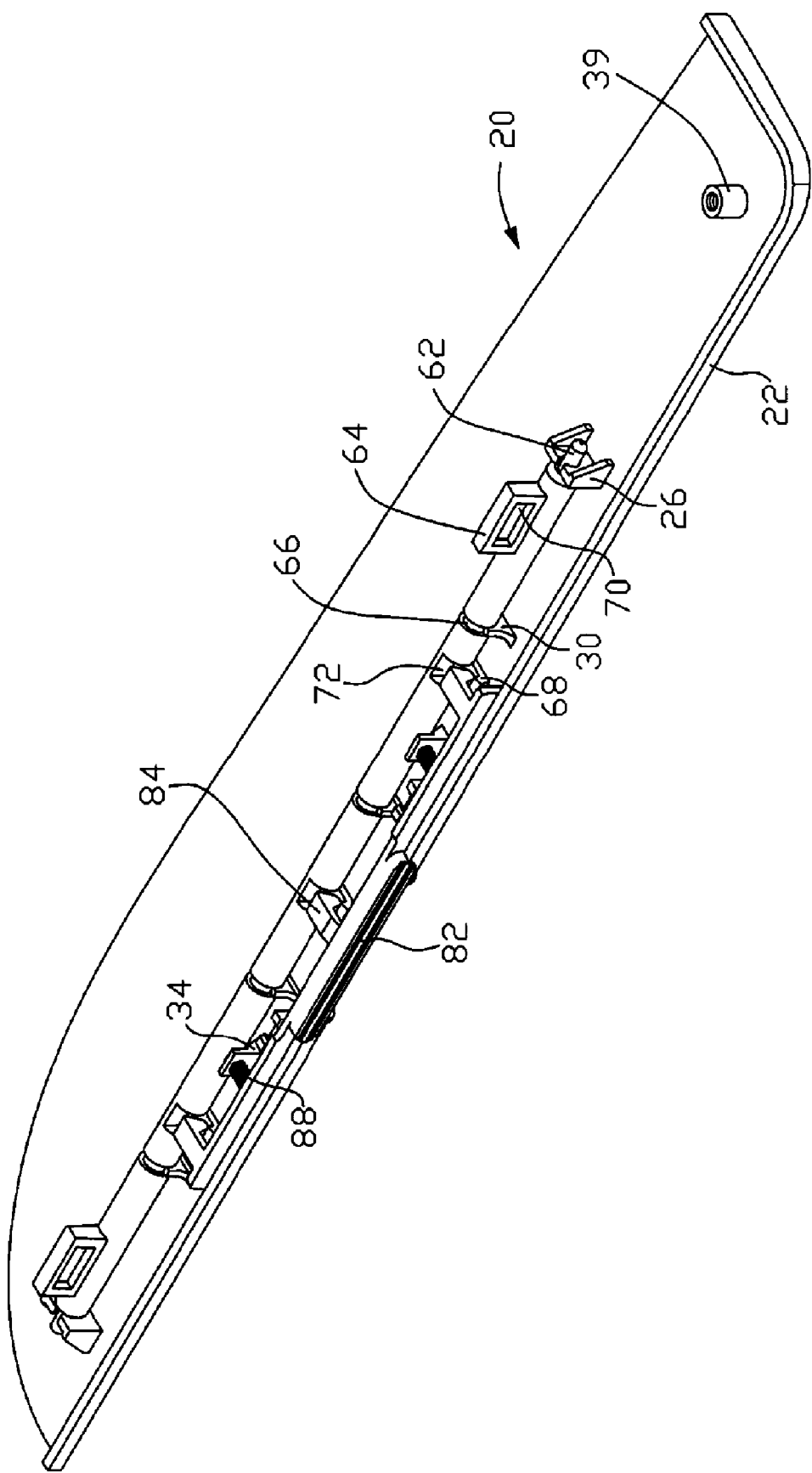
FIG. 3 is an assembled view of FIG. 2, showing the latch mechanism in a normal state.
Figure 4:
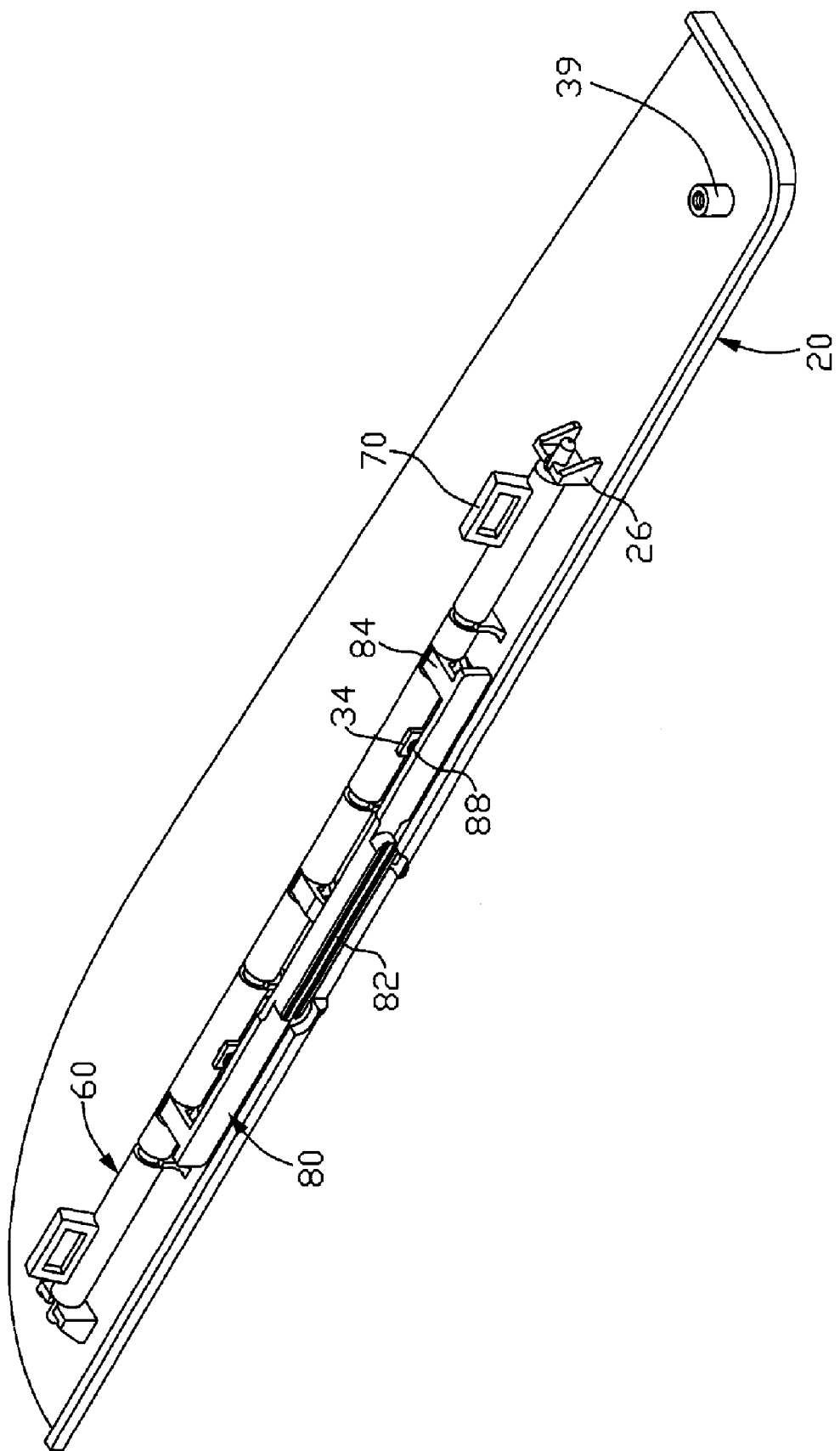
FIG. 4 is an assembled view of FIG. 2, showing the latch mechanism in a pivoted state.

Referring to FIGS. 3 to 5, in assembling the latch mechanism to the cover unit 2, the mounting posts 62 of the locking member 60 are received in the corresponding receiving cutouts 28 of the cover 20. The receiving slots 32 of the mounting tabs 30 of the cover 20 receive parts of the corresponding recessed portions 66 of the body 61 of the locking member 60. Thus, the locking member 60 is pivotably mounted to the cover 20. The sliding tabs 86 of the operating member 80 are inserted into the receiving spaces formed by the receiving tabs 38 of the cover 20. Thus, the operating member 80 is slidably assembled to the cover 20. The resilient members 88 are disposed between the operating member 80 and the corresponding projections 34 of the cover 20. The resilient members 88 are coil springs in this embodiment, and free ends of the resilient members 88 coil around the posts 36 of the cover 20 and the posts of the operating member 80, respectively. The operating portion 82 is received in the cutout 24 of the cover 20, and the latches 84 catch the corresponding hooks 68 of the locking member 60. Four screws (not shown) are inserted into the through holes 52 of the bezel 40 to engage in the threaded holes 390 of the corresponding positioning posts 39 of the cover 20. Thus, the bezel 40 is assembled to the cover 20. The receiving slots 48 of the mounting tabs 46 of the bezel 40 and the receiving slots 32 of the mounting tabs 30 of the cover 20 cooperatively enclose the corresponding recessed portions 66 of the body 61 of the locking member 60. The operating portion 82 of the operating member 80 is received in the cutout 44 of the bezel 40. The locking portions 64 protrude out from the corresponding through-holes 50 of the bezel 40. Thus, the latch mechanism is pivotably mounted to the cover 20.

The cover unit 2 is pivotably mounted to the base unit 4. In closing the cover unit 2 of the notebook computer, the cover unit 2 is pivoted toward the base unit 4. The locking member 60 is pivoted rearward when the locking portions 64 touch the corresponding protrusions 94 of the base unit 4 and move along the guiding surfaces 96 of the corresponding protrusions 94. The hooks 68 of the locking member 60 pull the corresponding latches 84 of the operating member 80, thus the operating member 80 moves rearward, and the resilient members 88 are compressed. When the protrusions 94 of the base unit 4 align with the corresponding locking holes 70 of the locking member 60, the resilient members 88 are restored to drive the operating member 80 to move back. The latches 84 of the operating member 80 pull the corresponding hooks 68 of the locking member 60, thereby the locking member 60 is pivoted back. The protrusions 94 of the base unit 4 are engaged in the corresponding locking holes 70 of the locking member 60. Thus, the cover unit 2 is closed.

In opening the cover unit 2, the operating portion 82 is pressed rearward to move the operating member 80 rearward. The resilient members 88 are compressed. The latches 84 extend into the corresponding recesses 72 and abut against the body 61 of the locking member 60. Thus, the locking member 60 is driven to pivot rearward. The protrusions 94 of the base unit 4 are disengaged from the corresponding locking holes 70 of the locking member 60. Thus, the cover unit 2 is easily opened.

Additionally, the latch mechanism of the embodiment can be used in other foldable electronic devices, such as a digital video disk (DVD) player.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A latch mechanism for fixing a cover unit to a base unit of a foldable electronic device in a closed position, the base unit comprising a pair of recessed portions, the latch mechanism comprising:

a locking member configured so as to be pivotably received in the cover unit of the foldable electronic device and pivotable around a longitudinal axis thereof, the locking member comprising a pair of locking portions configured for engaging with the corresponding recessed portions of the base unit of the foldable electronic device in the closed position;

an operating member configured so as to be slidably mounted to the cover unit, the operating member comprising at least one latch slidable toward the locking member to drive the locking member to pivot for disengaging from the corresponding recessed portions of the base unit in the closed position; and at least one resilient member connectable with the operating member and adapted for engaging with the cover unit of the foldable electronic device, for urging the operating member away from the locking member.

2. The latch mechanism as claimed in claim 1, wherein the locking member further comprises at least one hook extending therefrom, for being pulled by the at least one latch of the operating member to pull the locking member back.

3. The latch mechanism as claimed in claim 2, wherein the locking member defines at least one recess in the end of the hooks, for receiving the at least one latch of the operating member to drive the locking member to pivot.

4. The latch mechanism as claimed in claim 1, wherein at least one projection extends from the cover unit, the at least one projection forms a post thereon, the at least one resilient member is disposed between the operating member and the at least one projection, and an end of the at least one resilient member coils around the post of the at least one projection.

5. The latch mechanism as claimed in claim 1, wherein the operating member further comprises a pair of sliding tabs, the cover unit forms two pairs of L-shaped receiving tabs, the sliding tabs are received in corresponding receiving spaces cooperatively defined by the receiving tabs.

6. The latch mechanism as claimed in claim 1, wherein the cover unit forms a pair of locating portions each defining a receiving cutout, the locking member forms a pair of mounting posts extending outwardly from opposite distal ends thereof, the mounting posts are received in the corresponding receiving cutouts, for pivotably mounting the locking member to the cover unit.

7. The latch mechanism as claimed in claim 1, wherein each of the locking portions of the locking member defines a locking hole therein, each of the recessed portions forms a protrusion having a slanting guiding surface, the protrusions of the base unit are engaged in the corresponding locking holes of the locking member.

8. The latch mechanism as claimed in claim 7, wherein the cover unit defines a pair of through-holes, the locking portions of the locking member protrude out from the corresponding through-holes before engaging with the protrusions of the base unit.

9. The latch mechanism as claimed in claim 1, wherein the operating member further comprises an operating portion at a front side thereof.

10. A foldable electronic device, comprising:
a base unit comprising a recessed portion;
a cover unit, with one end thereof pivotably mounted about a first axis to a corresponding end of the base unit; and
a latch mechanism mounted to an opposite end of the cover unit, the latch mechanism comprising:
a locking member, the locking member mounted to the cover unit and pivotable about a second pivot axis parallel to the first pivot axis between an engaged position and a released position comprising a locking portion for engaging with the recessed portion of the base unit;
an operating member slidably mounted to the cover unit, the operating member comprising a latch engagable with the locking member, the operating member manipulated to drive the locking member via the latch to pivot for disengaging from the recessed portion; and
a pair of resilient members disposed between the cover unit and the operating member, for restoring the operating member to enable the latch of the operating member to drive the locking member to pivot back.

11. The foldable electronic device as claimed in claim 10, wherein the locking member further comprises a plurality of hooks extending therefrom, for being pulled by the corresponding latches of the operating member to pull the locking member back.

12. The foldable electronic device as claimed in claim 11, wherein the locking member defines a plurality of recesses in the end of the hooks, for receiving the corresponding latches of the operating member to drive the locking member to pivot.

13. The foldable electronic device as clamed in claim 10, wherein a pair of projections extends from the cover unit, each of the projections forms a post thereon, the resilient members disposed between the operating member and the projections, an end of each of the resilient members coils around the post of the corresponding projection.

14. The foldable electronic device as claimed in claim 10, wherein the operating member further comprises a pair of sliding tabs, the cover unit forms two pairs of L-shaped receiving tabs, the sliding tabs are received in corresponding receiving spaces cooperatively defined by the receiving tabs.

15. The foldable electronic device as claimed in claim 10, wherein the cover unit forms a pair of locating portions each defining a receiving cutout, the locking member forms a pair of mounting posts extending outwardly from opposite distal ends thereof, the mounting posts are received in the corresponding receiving cutouts, for pivotably mounting the locking member to the cover unit.

16. The foldable electronic device as claimed in claim 10, wherein each of the locking portions of the locking member defines a locking hole therein, each of the recessed portions forms a protrusion having a slanting guiding surface, the protrusions of the base unit are engaged in the corresponding locking holes of the locking member.

17. A foldable electronic device comprising:
a base unit comprising a first locking portion;
a cover unit mounted to the base unit and pivotable about a first pivot axis between a closed position for covering the base unit, and an opened position for uncovering the base unit;
a locking member mounted to the cover unit and pivotable about a second pivot axis parallel to the first pivot axis between an engaged position and a released position, the locking member including a second locking portion configured for engaging with the first locking portion in the engaged position in a manner so as to releasably retain the cover unit in the closed position; and
an operating member comprising at least one latch, mounted to the cover unit and slidable along a slide path perpendicular to the first and second pivot axes between an outer position and an inner position, wherein the operating member and the locking member are structured and arranged so that when sliding from the outer position to the inner position, the at one latch of the operating member drives the locking member to pivot from the engaged position to the released position.

18. The foldable electronic device of claim 17 further comprising a resilient member biasing the operating member toward the outer position.

19. The foldable electronic device of claim 17, wherein the operating member includes a latch extending substantially toward the locking member, the locking member includes a hook extending substantially toward the operating member, wherein the latch and the hook are structured and arranged so that when the operating member slides toward the inner position, the latch pushes the locking member to pivot in a direction toward the released position, and when the first locking portion engages with the second locking portion, the hook pulls the latch in a direction toward the inner position.

20. The foldable electronic device of claim 17, wherein the resilient member is a spiral spring, the cover unit forms a projection, and the spring is constantly compressed between the projection and the operating member.

* * * * *